United States Patent
Clulow et al.

(10) Patent No.: US 6,933,333 B2
(45) Date of Patent: Aug. 23, 2005

(54) CONDUCTIVE ADHESIVE SEALANT FOR BIPOLAR FUEL CELL SEPARATOR PLATE ASSEMBLIES

(75) Inventors: John Clulow, Kane County, IL (US); Jody Riddle, Kane County, IL (US); Francis Zappitelli, Walworth County, WI (US)

(73) Assignee: Bulk Molding Compounds, Inc., West Chicago, IL (US)

( * ) Notice: Subject to any disclaimer, the term of this patent is extended or adjusted under 35 U.S.C. 154(b) by 109 days.

(21) Appl. No.: 10/458,038

(22) Filed: Jun. 11, 2003

(65) Prior Publication Data

US 2004/0254294 A1 Dec. 16, 2004

(51) Int. Cl.⁷ .................................................. C08K 3/04
(52) U.S. Cl. ....................... 523/468; 523/440; 523/512; 523/513; 524/495; 524/496
(58) Field of Search ................................. 523/512–513, 523/440, 468; 524/495–496

(56) References Cited

U.S. PATENT DOCUMENTS

| | | | | |
|---|---|---|---|---|
| 3,227,665 A | * | 1/1966 | Fourcade et al. ............ 521/117 |
| 3,896,406 A | * | 7/1975 | Andersson et al. ......... 336/84 R |
| 4,237,244 A | * | 12/1980 | von Harpe et al. ......... 525/171 |
| 4,434,202 A | * | 2/1984 | Uedaira et al. .............. 428/143 |
| 5,756,777 A | * | 5/1998 | Shinohara et al. .......... 549/523 |
| 6,248,467 B1 | * | 6/2001 | Wilson et al. ................ 429/39 |
| 2003/0191228 A1 | * | 10/2003 | Noguchi et al. ............. 524/495 |

* cited by examiner

*Primary Examiner*—Peter Szekely
(74) *Attorney, Agent, or Firm*—Jack Schuman

(57) ABSTRACT

A conductive adhesive sealant comprising vinyl ester resin or polyester resin, graphite powder, peroxide free-radical initiator, milled carbon fiber, and a quinone-based inhibitor such as para benzoquinone.

8 Claims, No Drawings

CONDUCTIVE ADHESIVE SEALANT FOR BIPOLAR FUEL CELL SEPARATOR PLATE ASSEMBLIES

BACKGROUND OF THE INVENTION

1. Field of the Invention

This invention relates, broadly speaking, to a novel conductive adhesive sealant for bipolar fuel cell separator plate assemblies.

More particularly, this invention relates to a novel composition for a conductive adhesive sealant for bipolar fuel cell separator plate assemblies, based principally upon vinyl ester resins of a particular composition or range of compositions.

2. Description of the Prior Art

PBM (Polymer Electrolyte Membrane) fuel cells convert the reaction between hydrogen and oxygen gasses into electricity. Conductive separator plates are used to support the electrolyte membrane. Grooves in the plates distribute the gasses evenly to the electrodes deposited on the membrane. Electrons, generated at the anode, flow through the conductive plates to the adjacent cathode, where they combine with oxygen to form water using the protons from the adjacent cell. Electric current flows through a stack of contiguous plates and PBM membranes, and metallic collector plates at each end of the stack are used to collect the power generated. It is important to minimize resistive loss due to contact resistance in order to achieve optimum efficiency.

As licensee of Los Alamos National Laboratory under U.S. Pat. No. 6,248,467 (2001), Bulk Molding Compounds, Inc., the assignee of the present invention, supplies a graphite powder-filled, vinyl ester resin-based thermosetting molding compound, BMC 940, which can be compression molded to provide the net shape required for a separator plate geometry, in connection with which no machining is required.

Heat is generated in PEM fuel cell operation, and heat management is one of the aspects of stack engineering.

Heat typically is removed from the stack by circulating a liquid coolant through grooves between contiguous plates. Because the plate material is an excellent conductor of heat as well as of electricity, heat generated in the reaction is thus transferred to the liquid coolant and removed.

Two approaches to forming these coolant channels have been attempted, and problems have been associated with each approach.

In the first approach, an anode plate and a cathode plate are compressed together such that coolant channels are formed between them. In order to prevent leakage, elastomeric gasket material is used between the plates. There are two problems with this first approach. Firstly, the seal is subject to failure due to uneven compression or chemical attack by coolants. Secondly, electrons must bridge the contact points between the anode and the cathode, and since they are merely touching each other in this design, typically there is a relatively high degree of contact resistance which wastes stack power and generates additional unnecessary heat.

The second approach attempts to overcome these problems by permanently adhering the anode plate and the cathode plate using a liquid adhesive. Conductive liquid adhesives currently available typically use two-part epoxy binders filled with conductive material such as graphite. These systems must be used within a short period of time, minutes to hours. In order to achieve an effective seal, after application of the sealant to the plates has been accomplished, these systems require excessively long cycle times, up to several hours in duration. Finally, the bonded assembly has a through-plate resistance significantly higher than it would be had it been made from a single, solid piece of material.

As a matter of interest, U.S. Pat. No. 6,248,467 (2001) is directed to composite bipolar plates for electrochemical cells, consisting of a molded mixture of a vinyl ester resin and graphite powders. There is no disclosure in this patent of a conductive adhesive sealant for bipolar fuel cell separator plate assemblies.

As a matter of further interest, U.S. patent application Publication No. US2002/0055030 discloses a separator for a solid polymer type fuel cell produced by molding a vinyl ester series resin and graphite powder. There is no disclosure in this patent publication of a conductive adhesive sealant for bipolar fuel cell separator plate assemblies.

As yet another matter of further interest, U.S. Patent Application Publication No. US2002/0086198 discloses an electrically conductive resin composition comprising a vinyl ester resin, a radical polymerization initiator and carbonaceous filler, suitable for use as a separator for fuel cells. There is no disclosure in this patent publication of a conductive adhesive sealant for bipolar fuel cell separator plate assemblies.

SUMMARY OF THE PRESENT INVENTION

One of the objects of the present invention is to provide an improved conductive adhesive sealant for bipolar fuel cell separator plate assemblies.

Another of the objects of this invention is to significantly reduce cycle time for application and curing of the adhesive sealant thereby reducing the cost of fabrication.

Yet another object of the present invention is to improve the conductivity of the joint between adjacent separator plates thereby increasing the efficiency of the fuel cell stack.

Still another object of the present invention is to provide longer shelf life for the adhesive sealant.

Other and further objects of the present invention will become apparent by reference to the specification and claims.

The foregoing objects are attained by using a resin system similar to that used as a binder in the bipolar plate material to provide a highly compatible interface; by using a free radical initiator to cross-link the resin and bond the plates enabling this system to remain stable and usable for weeks under refrigeration. Cure time is less than one minute so that fabrication costs are significantly reduced. Voltage drop across plates bonded with the adhesive sealant of this invention is reduced by 30% over that of other conductive adhesives and 50% of that with plates merely in physical contact.

DESCRIPTION OF THE PREFERRED EMBODIMENT OF THE PRESENT INVENTION

The components of the adhesive sealant, the subject of this invention, are:

(1) Thermosetting vinyl ester with a viscosity less than 20,000 cps such as AOC's resins XR1409, T010, and S-342; Interplastic's resins VEX-168-296, VEX-184-322, and COR-VE-8032 and mixtures; and Dow resins Derakane 780 and Derakane 797; incorporated in a percentage by weight sufficient to yield a final viscosity between 5,000 cpa and 200,000 cps using a Brookfield viscometer with a T-bar "B" at 20 rpm. Typical percentage by weight in the final product will be in the range of 35% to 80%. The thermosetting resin cures under heat and pressure to provide a physical bond between the anode and cathode plates and also provides seals between coolant channels and gas channels.

(2) Graphite powder with a median particle size less than 100 microns such as Asbury 4827, Asbury Micro-450, Asbury A99, Asbury 4006 and Asbury 4007 incorporated into the final product in a percentage by weight sufficient to yield a final viscosity between 5,000 cps and 200,000 cps, using a Brookfield viscometer with T-bar "B" at 20 rpm. The graphite powder may be synthetic, natural flake, or microcrystalline (amorphous). Typical percentage by weight in the final product will be in the range of 10% to 50%. The graphite powder provides electrical conductivity across the bond line between the anode and cathode plates.

(3) Peroxide free-radical initiator such as Atofina's Luperox 256, Luperox M33, Luperox 331-80 and Luperox 26M50; Akzo Nobel's Trigonox 29B75 and Trigonox BPIC; Witco's Esperox 570P; and Degussa-Aztec's Peroxide TBPB, incorporated at a level ranging between 0.1% to 10% by weight based upon the weight of the thermosetting resin. The peroxide initiator initiates a free-radical reaction which crosslinks and cures the thermosetting resin.

(4) Milled carbon fiber with a median fiber length less than ¼ inch such as Asbury's AGM94F1050, AGM99MF0150 and AGM940400; Zoltek's Panex series PX30ME, PX30MF, PX33MP and PX33MX; and Fortafil's 341 and 342, incorporated in the final product in a range between 2% and 20% based upon the weight of the thermosetting resin. The milled carbon fiber provides structural integrity in the cured composite interface formed by the resin-graphite powder composite.

(5) Quinone such as para benzoquinone as a polymerization inhibitor, to increase shelf life and to retard polymerization until full clamp pressure is achieved—incorporated in the final product in a range between 0% and 2% based upon the weight of the thermosetting resin It will be seen that the broadest range of constituents in a conductive adhesive sealant suitable for the practice of the present invention is:

(1) Thermosetting vinyl ester with a viscosity less than 20,000 cps as measured with a Brookfield viscometer using a T-bar "B" at 20 rpm—approximately 35% to 80% by weight in the final product.

(2) Graphite powder with a median particle size less than 100 microns incorporated in the final product in a percentage by weight sufficient to yield a final viscosity between 5,000 cps and 200,000 cps as measured with a Brookfield viscometer with T-bar "B" at 20 rpm; the graphite powder may be synthetic, natural flake or microcrystalline (amorphous)—approximately 10% to 35% by weight in the final product (3) Peroxide free-radical initiator—incorporated in the final product in a range between approximately 0.1% and 10% in weight based upon the weight of the thermosetting resin (4) Milled carbon fiber with a median fiber length less than ¼ inch—incorporated in the final product in a range between approximately 2% and 20% by weight based upon the weight of the thermosetting resin (5) Quinone such as para benzoquinone—incorporated in the final product in a range between approximately 0% and 2% by weight based upon the weight of the thermosetting resin The specific composition for the preferred conductive adhesive sealant is:

(1) Thermosetting vinyl ester with a viscosity less than 20,000 cps as measured with a Brookfield viscometer using a T-bar "B" at 20 rpm—approximately 66% by weight in the final product.

(2) Graphite powder with a median particle size less than 100 microns—approximately 25% by weight in the final product (3) Peroxide free-radical initiator—approximately 2% by weight based upon the weight of the thermosetting resin (4) Milled carbon fiber with a median fiber length less than ¼ inch—approximately 6% by weight based on the weight of the thermosetting resin (5) Quinone such as para benzoquinone—approximately 1% by weight based on the weight of the thermosetting resin The preferred composition will produce a mixture with a Brookfield viscometer of 40,000–50,000 cps with a T-bar "B" at 20 rpm. Lower viscosities, down to 8,000 cps, can be achieved by thinning the mixture with additional unsaturated vinyl ester or polyester resin The composition chosen for the purpose of the present invention is mixed in the usual manner to produce the conductive adhesive sealant which is then applied to the facing surfaces of the anode and/or cathode separator plates. The plates may then be brought together to squeeze the sealant between. The sealant is then cured at an elevated temperature and polymerized, after which the assembly of anode and cathode plates is ready for use.

Conductive adhesive sealants made according to this invention, as described herein, exhibit superior properties of conductivity, superior adhesion to adjacent faces of anode and cathode separator plates, superior shelf life and superior sealing ability, as compared with alternative sealants.

Since modifications and changes which do not depart from the spirit of the invention as disclosed herein may readily occur to those skilled in the art to which this invention pertains, the appended claims should be construed as covering all suitable modifications and equivalents.

We claim:

1. a liquid conductive adhesive sealant for bipolar fuel cell separator plate assemblies, comprising:
   (a) approximately 35% to 80% by weight of thermosetting vinyl ester resin,
   (b) approximately 10% to 35% by weight of graphite powder,
   (c) approximately 0.1% to 10% by weight of a peroxide free-radical initiator based on the weight of said thermosetting resin,
   (d) approximately 2% to 20% by weight of milled carbon fiber based on the weight of said thermosetting resin.

2. A conductive adhesive sealant according to claim 1, wherein:
   (e) said thermosetting resin has a viscosity less than 20,000 cps as measured with a Brookfield viscometer using a T-bar "B" at 20 rpm.

3. A conductive adhesive sealant according to claim 1, wherein:

(e) said graphite powder has a median particle size less than 100 microns.

4. A conductive adhesive sealant according to claim 1, wherein:

(e) said milled carbon fiber has a median length less than ¼ inch.

5. A liquid conductive adhesive sealant for bipolar fuel cell separator plate assemblies, comprising:

(a) approximately 66% by weight of thermosetting vinyl ester resin, (b) approximately 25% by weight of graphite powder, (c) approximately 2% by weight of peroxide free-radical initiator, (d) approximately 6% by weight of milled carbon fiber.

6. A conductive adhesive sealant according to claim 5, wherein:

(e) said thermosetting resin has a viscosity less than 20,000 cps as measured with a Brookfield viscometer using a T-bar "B" at 20 rpm.

7. A conductive adhesive sealant according to claim 5, wherein:

(e) said graphite powder has a median particle size less than 100 microns.

8. A conductive adhesive sealant according to claim 5, wherein:

(e) said milled carbon fiber has a median length less than ¼ inch.

* * * * *